United States Patent Office 3,081,271

Patented Mar. 12, 1963

1

3,081,271

PROCESS FOR MIXING VAT DYE PASTE WITH A WATER-IN-OIL EMULSION

Charles Franklin Miller, Boothwyn, Pa., assignor to E. I. du Pont de Nemours and Company, Wilmington, Del., a corporation of Delaware No Drawing. Filed June 23, 1959, Ser. No. 822,181

3 Claims. (Cl. 260—22)

In the art of printing textile materials with vat dyes the printer prepares a printing composition by mixing an aqueous vat dye color paste with a bodying material called a "clear." In certain textile printing processes (e.g., the newly developed process descriped in Italian Patent 587,005 and U.S. Patent No. 2,907,624), the clear employed is a water-in-oil emulsion. Heretofore it has been necessary to add the aqueous color pastes to the emulsion clear and use homogenization equipment to obtain a paste of sufficient homogeneity to enable good textile prints to be obtained. Without long stirring with a homogenizer, the final paste has a grainy appearance and when used gives very poor color value and poor definition. The use of homogenization equipment is troublesome to the textile printer since it requires additional capital investment, time, and care to prepare a suitably satisfactory printing paste.

It has now been discovered, however, that when an amount of alkali metal hydroxide between about 0.1% and 1% by weight is incorporated in the aqueous vat dye paste prior to incorporation in the emulsion clear, simple hand mixing or at most simple mechanical stirrers are all that is required to obtain a paste of excellent homogeneity and high quality printing characteristics; it is, therefore, no longer required to use powerful and expensive homogenization equipment and spend the time and care heretofore required to obtain satisfactory print pastes.

It is an object of the present invention to provide an improved novel process for preparing for vat dye printing. It is a further object of this invention to utilize an alkali metal hydroxide incorporated in an aqueous vat dye paste prior to incorporating said paste in the emulsion clear. It is a further object of the present invention to enable the preparation for vat dye printing by utilizing simple mixing or stirring means to obtain a dye paste of excellent homogeneity. These and other objects will become apparent in the following description and claims.

More specifically, the present invention is directed to a process of mixing an aqueous vat dye paste with a water-in-oil emulsion clear, said clear comprising 20% to 35% of a hydrocarbon solvent, 1.2% to 4.2% of a solvent soluble resin, and 58% to 78% water, wherein the improvement comprises adding to the vat dye paste prior to mixing with the clear, about 0.1% to 1% of an alkali metal hydroxide, whereby emulsification of said vat dye paste in said clear is enabled to occur with simple stirring and eliminating the need for homogenizatoin equipment.

In the process of the present invention, it is necessary to have in the aqueous vat dye paste from about 0.1% to about 1% by weight of the paste of an alkali metal hydroxide. This alkali metal hydroxide may be incorporated in the aqueous vat dye paste at any time prior to emulsification of the paste with the clear. When the metal hydroxide is put in the clear, rather than in the dye paste, however, no significant improvement in ease of mixing is obtained.

Preferably, the alkali metal hydroxide will be incorporated in the vat dye paste during its standardization; that is, after its preparation and during the finishing steps to make it a commercial product. Alternately, however, the alkali metal hydroxide may be incorporated in the aqueous vat dye paste just prior to its use in the emulsion clear.

2

Incorporation of the alkali metal hydroxide is carried out quite simply. An aqueous solution of the alkali metal hydroxide is used and it is added with hand or mechanical stirring to thoroughly mix the ingredients and make a smooth homogeneous paste. A 25% to 30% by weight aqueous solution is conveniently used, but solutions of about 35 weight percent to 5 weight percent are also readily employed. Solutions containing less than about 5% of the alkali metal hydroxide are to be avoided since they will dilute the aqueous vat dye paste somewhat more than considered desirable.

The alkali metal hydroxides may be any of those hydroxides whose metal cation falls in group I of the periodic table. Thus, lithium hydroxide, sodium hydroxide, potassium hydroxide, cesium hydroxide, etc., which are representative, may be used. Preferably, sodium hydroxide will be employed. Most other strongly alkaline materials such as sodium and potassium carbonates, alkaline phosphates, ammonium hydroxide, sodium sulfide, amines and alkylolamines, are not operable in this process. Dispersing agents, too, as for example, ligninsulfonates, have no beneficial effect on ease of mixing the vat dye paste into the clear. Some beneficial effects have been observed with high concentrations of sodium silicate and quaternary ammonium hydroxides (e.g., trimethylbenzylammonium hydroxide and tetraethanolammonium hydroxide), but these agents impart adverse effects which cannot be tolerated; e.g., silicates in the printing paste will scratch delicate print rolls and the quaternary ammonium hydroxides cause instability of the print pastes at useful concentrations.

The amount of alkali metal hydroxide incorporated in the aqueous vat dye paste is critical in the present invention; the amount will be between about 0.1% and 1% by weight of paste. When less than about 0.1% is used, the beneficial effect is obtained to some slight extent, but usually 0.1% or more will be used. On the other hand, when more than about 1% by weight is used it has an adverse effect on the stability of the print paste made with it. This adverse stability is the result of a decrease in viscosity which is caused by an excessive amount of the alkali.

The manner by which this invention functions is not fully understood. It does not, however, appear to be simply a matter of pH since, as indicated, many strongly alkaline materials which give high pH increases are not operable. It has been observed, however, that when using 0.1% to 1% alkali metal hydroxide as indicated above, the pH of the vat paste is usually between about 12.5 and 12.65.

The water-in-oil emulsion clear will usually consist of from about 20% to 35% of hydrocarbon solvent, from about 1.2% to 4.2% of an alkyd or other type resin, and from 58% to 78% by weight of water. This emulsion clear is prepared by emulsifying the liquid organic solvent containing the alkyd or other resin with water. The emulsification is best accomplished with a high speed homogenizer. Mixed hydrocarbon solvents for the clear may be employed, and other water immiscible solvents such as turpentine, pine oil, etc., may be added to confer desirable characteristics to the final printing paste. It is usually desired to add a small amount of an alkali metal carbonate to neutralize any acidity that may be present. Usually the addition of small amounts of neutral salts such as sodium chloride will increase the viscosity of the emulsion. The water-in-oil clear emulsion should have a viscosity of between 300 and 40,000 cps. as determined at 75° F. in the Brookfield viscometer using a No. 4 spindle of 12 r.p.m. If this base is too viscous or too fluid, printable pastes are difficult to obtain when the aqueous dye paste is added. It will be obvious to those skilled in the art that in the preparation of the water-in-oil clear, the emulsification should be carried out to a point where the dispersed phase is in very minute droplets, preferably below 5 microns.

It appears that the improvement obtained by use of the alkali metal hydroxide is limited to a water-in-oil emulsion clear of the type just described. Attempts to improve mixing characteristics of vat dye pastes with oil-in-water clears by means of alkali metal hydroxides have not been successful. The significant requirement of the clear appears to reside in its water-in-oil character and its composition of hydrocarbon solvent, resin, and water as set out above.

The organic water-immiscible solvents forming the oil phase in the water-in-oil emulsion clear should have a kauri-butanol value of from 40 to 100 so that the resin will have the desired degree of solubility in this oil; this value is described in the Condensed Chemical Dictionary, 5th edition, page 620.

The preferred oils are those which have a high flash point (to reduce hazards in the printing process) and should be readily removable by washing or volatilization during the drying operation. Thus, the organic solvent employed is preferably of the aliphatic type although it may contain high percentages of naphthenics and/or aromatics. Aromatic solvents such as solvent xylene and other aromatic solvents of this type may be employed as the water-immiscible phase.

The resins employed are preferably those which are self-emulsifying in organic solvents with water, although emulsifying agents may be employed, particularly with those which are otherwise difficult to emulsify in the system. The preferred resins are those which are readily permeated or dissolved by the caustic alkali reducing solution subsequently used in the printing process so as not to prevent rapid reduction of the vat dye color prints.

These preferred resins for use in the preparation of these water-in-oil emulsion clears are the alkyd resins, preferably the modified alkyd resins, which for the purpose of this invention are soluble in aqueous alkaline reducing solutions at 212° F. As examples of this type of resin, mention may be made of an alkyd resin made by using approximately 42% phthalic anhydride and 37% cotton seed oil, the balance being the conventional polyhydric alcohol such as glycerin, glycol, etc., or those resins modified with other oils such as soya bean oil, etc., as further illustrated in the examples. These resins will be incorporated in the form of an organic solvent solution, since they are usually soluble in organic solvents and particularly in aromatic hydrocarbon solvents. Other resins such as the epoxy resins, melamine-formaldehyde resins, ureaformaldehyde resins, methacrylate resins, and the styrene-modified alkyd resins are illustrative of the types that may be employed, although, as stated above, the alkyd resins are preferred. Specific examples of other resins which may be used include an unmodified liquid epoxy resin having a viscosity of 10,000 to 14,000 centipoises [Brookfield viscometer 23° C. (73° F.)] and an epoxy value of >4.80 eq./100 g.; an unmodified liquid epoxy resin having a viscosity of 20,000 to 40,000 centipoises [Brookfield viscometer 23° C. (73° F.)] and an epoxy value of 0.440–0.480 eq./100 g.; and a copolymer prepared by copolymerizing 90 parts of "Lorol" fatty alcohol methacrylate and 10 parts of diethylaminoethyl methacrylate. Where resins are employed which are difficult to emulsify, it is usually advantageous to use small amounts of the alkyd resins as emulsifying agents.

Other emulsifying agents, however, may be employed with these resins, such as esters of fatty acids, for example, lauric, palmitic or stearic acid esters of sorbitan and other alcohols, diethylaminoethylmethacrylate polymers, or copolymers of diethylaminoethylmethacrylate with fatty alcohol methacrylates such as "Lorol" methacrylate.

The aqueous dye pastes which are usually incorporated in the water-in-oil emulsion clears to produce the emulsion printing paste are standard commercial vat dye pastes which normally contain from 8% to 25% color solids and may contain from about 0.1% to 10% of dispersing agent or agents and other miscellaneous additives normally present in aqueous color printing pastes such as sodium acetate, sodium sulfate, carboxy methylcellulose or other thickeners.

The final print paste then which is also a water-in-oil emulsion obtained by adding the aqueous vat dye paste containing the alkali metal hydroxide to the clear will usually have the following composition:

| | Percent |
|---|---|
| Vat dye (dry) | 0.02 to 6 |
| Resin | 1 to 4.5 |
| Alkali metal hydroxide | 0.00008 to 0.50 |
| Total dispersing agents | 0.00015 to 3.0 |
| Total organic solvent | 20.0 to 35.0 |
| Water | 78.98 to 51.5 |

The printing process with the readily emulsified print paste obtained by the process of this invention may be carried out in accord with the details known in the art. The vat dye printing paste is applied to the textile material from conventional textile printing equipment and conventional shallow engraved intaglio rolls which may be run at higher speeds than when employing the aqueous thickened vat dye pastes. After printing on the textile material, the prints are dried by conventional methods. Subsequently, the prints are impregnated in any conventional type of dye pattern with a solution of caustic alkali and sodium hydrosulfite which may contain a wetting agent (and, if desired, a thickening agent) and then led immediately into an air-free steam atmosphere at a temperature between 212° F. and 290° F. for periods of from 7 to 30 seconds. The printed cloth is then oxidized and soaped by conventional methods, whereby the dye is converted back to the oxidized form and fixed in the fibers. During the steaming treatment, the resin is permeated or solubilized by the action of the caustic alkali and is at least in part and usually substantially removed from the fabric during the subsequent scouring treatment.

The prints thus obtained are sharp in outline, smooth, outstanding in strength and brightness, fast to light, washing and crocking.

The emulsion clear, the print paste and the process of printing as described in this case are all fully described in Italian Patent 587,005 which is the Italian counterpart of the aforementioned U.S. Patent 2,907,624 to Saville.

Representative examples illustrating the present invention are as follows:

*Example I(A)*

*Part (a)*.—Three (3) parts of a xylene solution of a cotton seed oil modified alkyd resin (60% resin solids) of the type currently sold by Rohm and Haas under the designation "Duraplex A–27" is colloidally dispersed in 32 parts of a liquid hydrocarbon having a kauri-butanol value of 43.5, available on the market as "Varsol No. 2." This dispersion is emulsified with 65 parts of water, using a high speed homogenizer such as the Eppenbach mixer. The water-in-oil emulsion thus obtained has a viscosity of 1000 centipoises at 77° F. when determined in a Brookfield viscosimeter, model LVF, employing a No. 4 spindle at 12 r.p.m. This emulsion is a light-colored, viscous paste. The alkyd resin employed in this example is made using 42% phthalic anhydride. 37% cotton seed oil, the balance being the conventional polyhydric alcohol such as glycerin, glycol, etc. As a 60% solution in xylene, this solution has a Gardner-Holdt viscosity rating of Z–7 and an acid number (of the solids) of 5–10.

*Part (b)*.—Ten (10) parts of a vat dye paste containing 19 weight percent color solids of a vat dye known as Vat Green 3 (New Color Index, old designation PR–293), is added to 90 parts of emulsion (*a*), using a high-speed mechanical homogenizer. The stable emulsion which is obtained is the printing paste.

*Part (c)*.—The printing paste of Example I, part (*b*) is printed on cotton muslin fabric from an engraved copper roller. The printed fabric is then dried on hot cans for 1 to 5 minutes at from 220° to 275° F. The color-fugitive print is then developed by padding with an alkaline reducing solution which contains 4% by weight of caustic (sodium hydroxide), 6% by weight of sodium hydrosulfite, 0.1% by weight of a high fatty alcohol sodium sulfate surface-active agent having a chain of from 8 to 10 carbon atoms, and about 1% by weight of alkali-compatible starch. Within a fraction of a second, the fabric is passed through the above chemical-pad liquor and squeeze rolls, and then directly into an air-free steamer. During the 7 to 30 seconds that the fabric is in the steamer at from 214° to 290° F., the vat dye is reduced to its leuco form and fixed in the fiber. The prints are then finished by oxidizing the leuco form to the final insoluble vat dye by passing the fabric through 2% by weight of a hydrogen peroxide solution which is 16.5% by weight active oxygen, and 2% by weight of glacial acetic acid at 140° C. for 1 minute. The printed fabric is then scoured in 0.5% by weight of sodium oleate solution at 180° F. for 10 minutes, rinsed with clear water, and dried.

The tinctorial value of the resulting bright green print as observed visually is excellent as is also light-fastness, wash-fastness and crock-fastness.

*Example I(B)*

When Example I(A) is repeated, except that the high-speed mechanical homogenizer is replaced by hand stirring with a spatula, the resulting print paste was grainy and of poor stability. When it is used for the printing process as described above the printed textile is extremely weak and has poor definition.

*Example I(C)*

To 10 parts of the vat dye paste of Example I, part (*b*) is added 0.5 part of a 10% by weight aqueous solution of sodium hydroxide and the mixture stirred by hand with a stirring rod for a few minutes to make a smooth paste. (The pH of the vat paste before addition of the caustic was 10.95 and it increased to 12.65 after the caustic was incorporated.) Then 10 parts of this paste are added to 90 parts of the emulsion of Example I, part (*a*) and the pastes mixed by hand with a spatula for a few minutes until a smooth paste is obtained. This paste is then used to print cotton as described in Example I, part (*c*). The bright green print has the same excellent properties as those obtained when the dye paste and the clear emulsion are mixed with the homogenizer.

*Example 2*

Aqueous vat dye pastes containing an alkali metal hydroxide were prepared according to the following formulations:

| Vat Dye Paste | All Parts By Weight | | | | |
|---|---|---|---|---|---|
| | (*a*) Vat Black 100 | (*b*) Vat Green 1 100 | (*c*) Vat Blue 6 100 | (*d*) Vat Black 100 | (*e*) Vat Black 100 |
| 10% LiOH Solution | 5 | -------- | -------- | -------- | -------- |
| 25% KOH Solution | -------- | 2 | -------- | -------- | -------- |
| 10% NaOH Solution | -------- | -------- | 5 | -------- | -------- |
| 35% NaOH Solution | -------- | -------- | -------- | 2 | 4 |
| Water | -------- | -------- | -------- | 3 | 1 |

10 parts of each of the above pastes were then mixed with 90 parts of the emulsion clear as in Example I(C). In each case, a smooth emulsion is obtained, with the exception that in case (*e*), the emulsion became too thin to be useful. (This is due to the amount of caustic exceeding about 1% (actually 1.3%) by weight of the vat dye paste.)

Each of the print pastes (*a*) through (*d*) were then used to print cotton according to the procedure of Example I and excellent prints were obtained.

The use of potassium carbonate in any of the above examples results in no improvement in ease of mixture and results in print pastes essentially the same as obtained in Example I(B).

Instead of using Vat Green 3 in Example I(C), aqueous pastes of any of the following vat dyes may be substituted to obtain similar results.

| New Color Index dye name: | Old CI designation |
|---|---|
| Vat Yellow 2 | -- |
| Vat Yellow | -- |
| Vat Yellow 22 | -- |
| Vat Orange 4 | PR–381 |
| Vat Orange 9 | CI–1096 |
| Vat Orange 3 | PR–116 |
| Vat Brown 20 | PR–622 |
| Vat Brown 40 | -- |
| Vat Green 8 | PR–122 |
| Vat Brown 5 | PR–121 |
| Vat Red 13 | PR–124 |
| Vat Red 1 | PR–109 |
| Vat Red | PR–107 |
| Vat Violet 13 | CI–1163 |
| Vat Violet 1 | CI–1104 |
| Vat Blue 14 | CI–1112 |
| Vat Blue 6 | CI–1113 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In a process of mixing an aqueous vat dye paste with a water-in-oil emulsion clear to produce a final print paste of the following composition by weight:

| | Percent |
|---|---|
| Vat dye (dry) | 0.02 to 6.0 |
| Resin selected from the group consisting of alkyd resins, epoxy resins, melamine-formaldehyde resins, urea formaldehyde resins, and methacrylate resins | 1.0 to 4.5 |
| Dispersing agent | 0.00015 to 3.0 |
| Organic solvent having a kauri-butanol value of from 40 to 100 | 20.0 to 35.0 |
| Water | 78.98 to 51.5 |

the improvement of facilitating the miscibility of said paste with said clear by the addition of an alkali metal hydroxide to said paste, prior to mixing, in an amount of 0.00008% to 0.50% by weight, based on the final composition.

2. The process of claim 1 wherein said resin is an alkyd resin.

3. The process of claim 1 wherein the alkali metal hydroxide is sodium hydroxide.

References Cited in the file of this patent

UNITED STATES PATENTS

| | | |
|---|---|---|
| 2,335,905 | Meade et al. | Dec. 7, 1943 |
| 2,361,454 | Cassel | Oct. 31, 1944 |
| 2,565,358 | Douglas | Aug. 21, 1951 |
| 2,907,624 | Saville | Oct. 6, 1959 |
| 2,976,110 | Gund et al. | Mar. 21, 1961 |

UNITED STATES PATENT OFFICE

CERTIFICATE OF CORRECTION

Patent No. 3,081,271 March 12, 1963

Charles Franklin Miller

It is hereby certified that error appears in the above numbered patent requiring correction and that the said Letters Patent should read as corrected below.

Column 6, line 62, after "an" insert -- oil-modified --.

Signed and sealed this 24th day of September 1963.

SEAL)
.ttest:

RNEST W. SWIDER
.ttesting Officer

DAVID L. LADD
Commissioner of Patents